(12) United States Patent
Schmidt

(10) Patent No.: US 7,975,013 B2
(45) Date of Patent: Jul. 5, 2011

(54) RETENTION MANAGEMENT FOR INSTANT MESSAGES

(75) Inventor: Olaf Schmidt, Heidelberg (DE)

(73) Assignee: SAP AG, Walldorf (DE)

( * ) Notice: Subject to any disclaimer, the term of this patent is extended or adjusted under 35 U.S.C. 154(b) by 149 days.

(21) Appl. No.: 12/268,485

(22) Filed: Nov. 11, 2008

(65) Prior Publication Data

US 2010/0131470 A1 May 27, 2010

(51) Int. Cl.
*G06F 15/16* (2006.01)
(52) U.S. Cl. ......... 709/206; 709/218; 709/227; 709/249
(58) Field of Classification Search .................. None
See application file for complete search history.

(56) References Cited

U.S. PATENT DOCUMENTS

| 7,120,455 | B1 * | 10/2006 | Chen et al. | 455/466 |
| 2008/0043958 | A1 * | 2/2008 | May et al. | 379/201.02 |
| 2010/0107088 | A1 * | 4/2010 | Hunt et al. | 715/752 |

* cited by examiner

*Primary Examiner* — John B. Walsh

(57) ABSTRACT

Disclosed are methods and systems of retaining instant message content related to usage of one or more instant message applications subject to obligations of retention. A user request to access the one or more instant message applications results in requesting a instant message master log on credential from the user and mapping the IM master log on credential of the user with instant message application specific log on credentials of the user associated with at least one of the IM applications to give a centralized and controlled access to the user who may be subject to obligations for retention of IM communications. An IM session of at least one of the one or more instant message applications may also be opened according to IM application settings rules associated with the IM master log on of the user. The IM communication generated during the session is stored based on the instant message retention rule associated with the IM master log on of the user.

17 Claims, 7 Drawing Sheets

RETENTION MANAGEMENT FOR INSTANT MESSAGES

FIELD OF THE INVENTION

The invention generally relates to systems and methods for electronic discovery within a business environment and, more particularly, to methods and systems for creating, facilitating, or otherwise managing legal processes involving business objects, documents and other transactional data.

BACKGROUND OF THE INVENTION

Instant messaging (IMs) have become an increasingly popular method of communication in the business world. IM is a method of real-time communication based on typed text that is typically transmitted via computers connected over a network such as the Internet. Some typical examples of IM applications include Instant Messenger® by AOL® Corporation, Yahoo Messenger® by Yahoo® Corporation, and Windows® Messenger by Microsoft® Corporation. This type of real-time communication has the benefit of being efficient and easy to use. The amount of data that instant message (IM) applications create every year is staggering—more than five billion messages a day aggregating to 750 GB, or 274 terabytes a year.

IMs are free-form, and when a user closes an IM dialogue box, at the end of a conversation, the content generally disappears without being stored for later retrieval. However, with the advent of e-discovery, and amendments to the Federal Rules of Civil Procedure (FRCP), many electronically stored documents including IMs have become subject to discovery in litigation. The IMs pose a particularly unique challenge to the litigation world. Content in IM communication is becoming increasingly relevant for litigation. Accordingly, this type of electronic information has to be taken into account during legal discovery process. In fact, some industries are creating regulatory rulings that mandate which communications must be stored and for how long. For example, the financial services industry has been recently directed to retain all communications with clients for a period of three years. Securities and Exchange Commission (SEC) Rule 17a-4 outlines which records must be preserved by certain exchange members, brokers, and dealers. The SEC has expanded this rule to include new communication technologies such as e-mail, the internet, and IMs. Efficient mechanisms are needed to allow consideration of IMs for document retention management and e-discovery processes in order to comply with discovery requests in litigation.

One of the technological barriers for the litigator is that business users typically use a number of different types of IM applications and each IM application has a different setting for archiving conversations, which presents a challenge for uniformly complying with e-discovery process. Currently there is no method and system to provide a solution to the above listed challenges.

SUMMARY OF THE INVENTION

Disclosed herein are methods and systems of identifying and retaining IM content related to a usage of one or more IM applications subject to retention obligations.

In one aspect, the method involves receiving a user request to access the one or more IM applications. In response to such a request, requesting a IM master log on credential from the user and mapping the IM master log on credential of the user with application specific log on credentials of the user associated with at least one of the IM applications. Based on the master log on, a further aspect of the invention involves, opening an IM session of at least one of the IM applications according to the IM application settings rules, retrieving at least one IM retention rule and storing IM content of the IM session based on IM retention rules.

In yet another aspect, the invention further provides retention management for recorded IM content stored in a central repository. The recorded IM content is stored for a retention time according to legal hold or guidelines or otherwise improving compliance during e-discovery processes, for instance. The recorded IM content is deleted from the central repository on expiration of the retention time.

Additional features and advantages will be made apparent from the following detailed description of illustrated embodiments, which proceeds with reference to the accompanying drawings.

BRIEF DESCRIPTION OF THE DRAWINGS

A better understanding of embodiments of the invention are illustrated by examples and not by way of limitation, the embodiments can be obtained from the following detailed description in conjunction with the following drawings, in which.

DETAILED DESCRIPTION

Figure 1A:
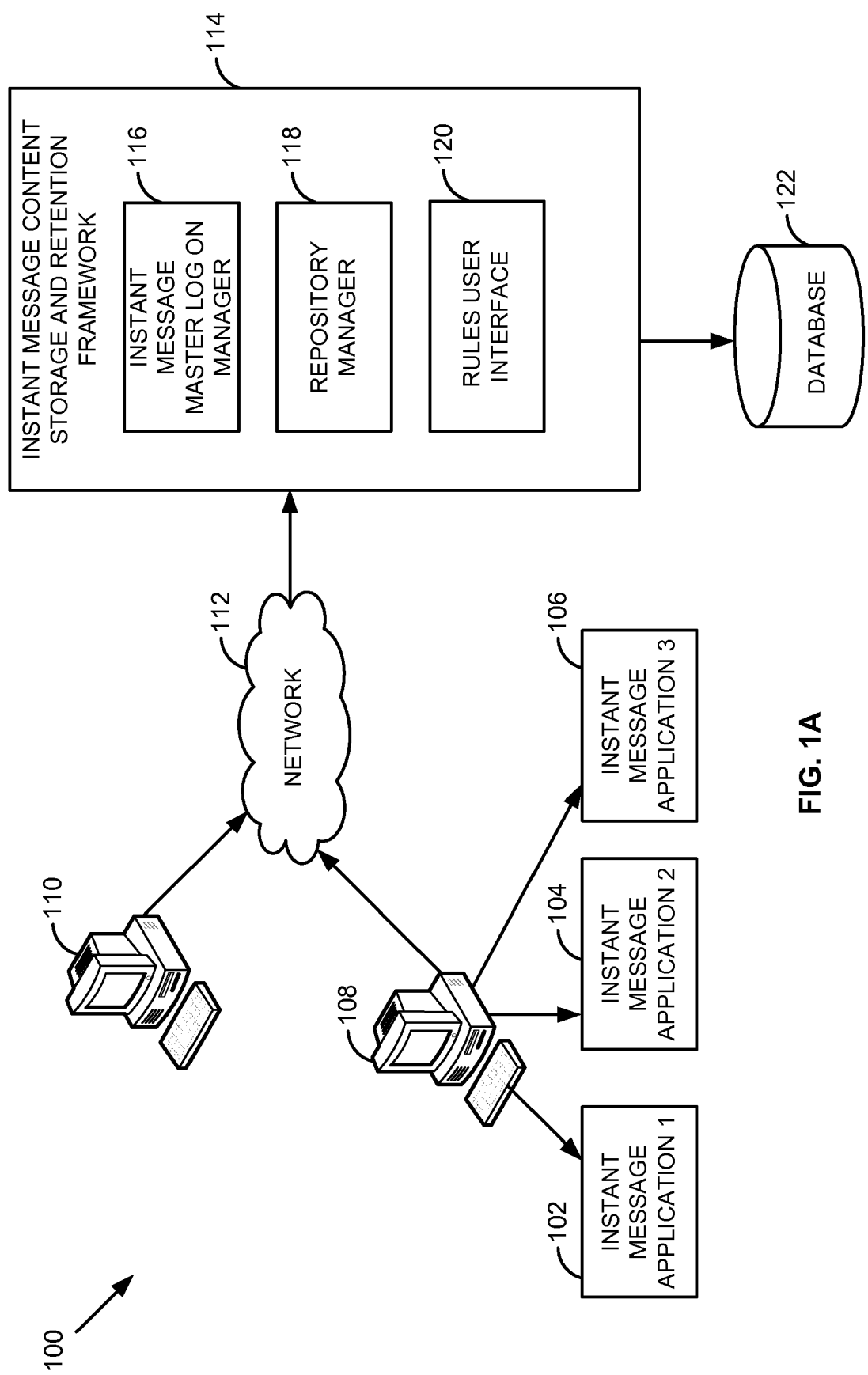
FIG. 1A illustrates an exemplary business environment of IM applications subject to retention obligations according to an embodiment of the invention and one overall exemplary system architecture for implementing a centralized IM application management and IM content storage and retention framework.

Legal hold can be described as a process by which an organization must preserve and prepare for production certain of types of communication when litigation is anticipated or confirmed. A major factor driving the need for a complete and highly capable Legal Hold (LH) solution was a result of substantive changes to the Federal Rules of Civil Procedures (FRCP). FRCP addresses the discovery of electronically stored information (ESI) (also known as e-discovery) including electronic communication (e.g., email). The amendments were precipitated by persistent legal arguments and tactics related to the production of ESI, such as the cost and difficulty of producing such ESI, and claims that such ESI was missing, deleted, or otherwise inaccessible when it really was not the case. These changes have been effective from Dec. 1, 2006 and require organizations to hold all electronic records until each legal matter is formally settled, even if an organization only reasonably anticipates litigation. FRCP also accelerates several timelines that have an enormous impact on e-discovery requirements that can only be addressed with technology due to the volumes and complexities involved.

The "legal hold" operates at the intersection of litigation and corporate retention practices, and it has emerged as an almost obligatory component of a company's response to notice or reasonable anticipation of litigation. The basis of this obligation is the common law duty against spoliation, that is, the duty to avoid the loss of, destruction of, or failure to preserve information that may be relevant to pending or potential proceedings.

Electronic legal discovery (e-discovery) refers to a process in which electronic data is located, searched and secured with the intent of using it as evidence in a law suit. Digital data is well-suited to investigation because it can be electronically searched, whereas paper documents must be analyzed manually. In the process of e-discovery, data of all types can serve as evidence. This can include text, images, calendar files, databases, spreadsheets, audio files, animation, web sites, and computer programs. New rules for e-discovery of documents in civil cases came into effect in December 2006. Failure to comply with these rules can result in significant penalties for companies, legal experts and executives. For instance, the rules require that when two companies are involved in civil litigation, they must meet within 30 days of the filing of the law suit to decide how to handle electronic data. The parties must agree on which records are to be shared and in which electronic format, as well as on a definition for accessible data.

Instant communication such as Electronic mail (e-mail) and instant messaging can be an especially valuable source of evidence in civil or criminal litigation. Instant messaging in particular has become a popular way for business users to communicate with their colleagues with their business entity or even out side their business entity. Accordingly, some such communication may be subject to e-discovery. IM conversations however are typically only stored in volatile memory and disappear when the user exits the application but some or all of such conversations may have to be saved. Saving all such conversation would simply be too burdensome not to mention too risky because it would be over inclusive. Many of the users may also maintain more than one IM account with many different IM applications. So controlling access to such applications in order to determine whether the user and their particular use context comes under some obligation to retain the IM conversation can be simplified by centralizing the access, for instance.

FIG. 1A illustrates an exemplary business environment of IM applications subject to retention obligations according to an embodiment of the invention and one overall exemplary system architecture for implementing a centralized IM application management and IM content storage and retention framework. In one embodiment, the typical business user environment is a distributed environment 100 which includes a case manager 110, a business user 108, a communication network 112, an IM content storage and retention framework 114, and a database 122. The case manager 110 preferably has administrative duties and manages case meta-data, documents, retention rules, email storage, IM storage and so on. The case manager 110 communicates with the IM content storage and retention framework 114 via the communication network 112 through APIs to perform administrative duties such as setting rules for retention, to define settings that are acceptable for opening an IM application with and so on. Accordingly, the case manager 110 may have a higher level access to the framework 114 in order to conduct activities such as managing a user's access to IM applications. To manage users' access, the IM content storage and retention framework 114 further includes an IM master log on manager 116, which provides centralized access to IM application thereby allowing the access, the use and storage of content created to be controlled and regulated according to the organization's needs. The IM master log on manager 116 also enables the business user 108 to log on to several IM applications (e.g., 102, 104 and 106) by providing a central user authentication. The framework 114 further includes a repository manager 118 for managing and coordinating the storage, retention and deletion of the IM communications content according to retention rules, for instance. The rules user interface 120 allows the case manager 110 to describe the rules according to which the IM content storage and retention will be managed. The database 122 is configured to include a central repository for storing IM communications content of interest, a rule repository for storing setting rules based on which IM application will be opened upon access.

Figure 1B:
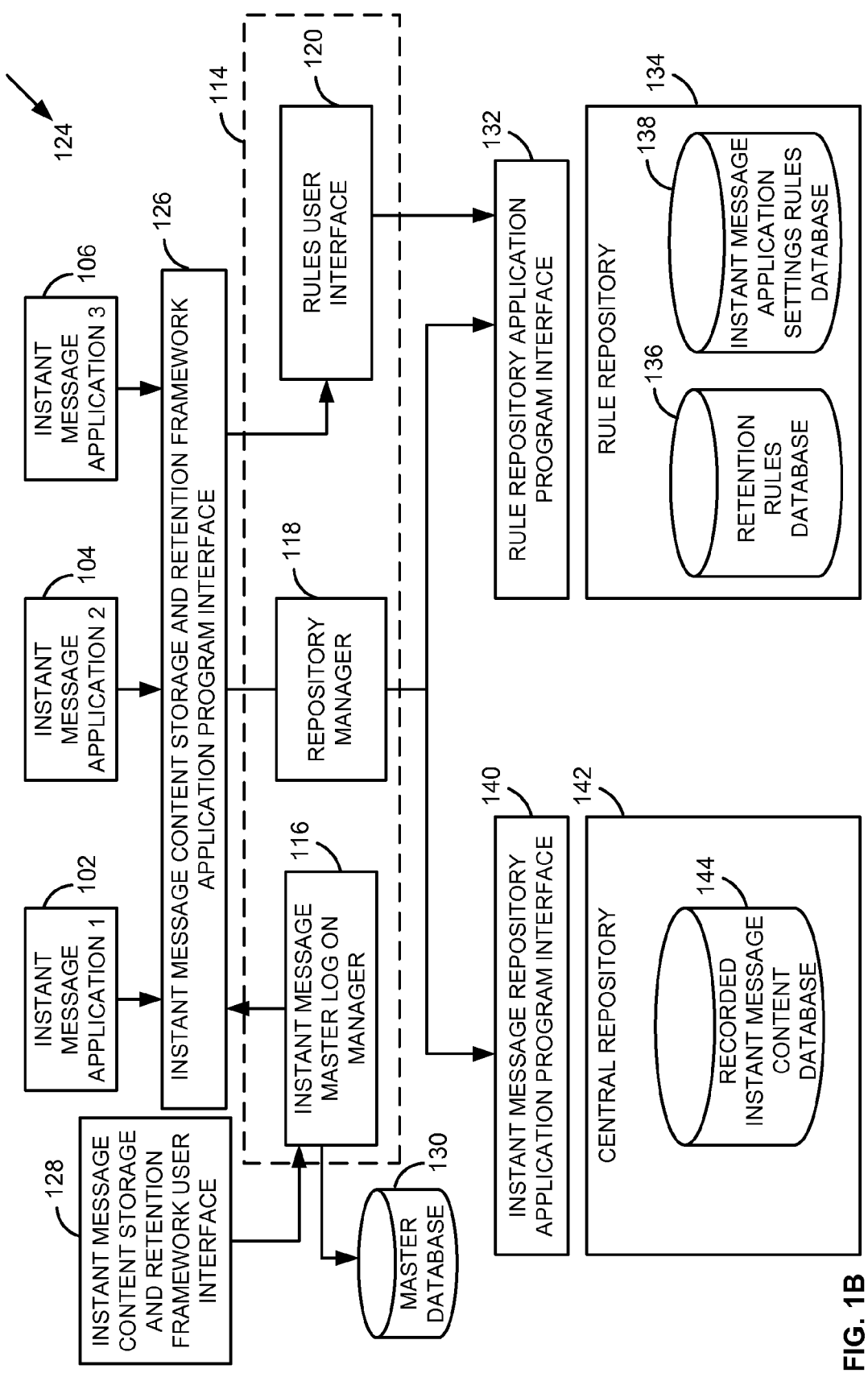
FIG. 1B illustrates an exemplary IM content storage and retention framework for identifying and retaining IM content subject to regulatory compliance measures such as IM content retention obligations according to an embodiment of the invention.

FIG. 1B illustrates an exemplary system 124 for identifying and retaining IM content subject to regulatory compliance measures such as retention obligations according to an embodiment of the invention. An IM content storage and retention framework application programming interfaces (API) 126 are connector API's that allow one or more IM applications communication access to IM content storage and retention framework 114. Vendors of IM applications (e.g., 102, 104 and 106) can provide function calls to IM content storage and retention framework 114 via the IM content storage and retention framework API 126.

In one embodiment, system administrators can register several IM applications (e.g., 102, 104 and 106) to the IM content storage and retention framework 114 using the IM content storage and retention framework user interface 128. Preferably, the IM application vendors implement API functions to support the integration of the one or more IM applications into the IM content storage and retention framework API 126.

The IM content storage and retention framework 114 provides a mechanism for central user authentication for several IM applications (e.g., 102, 104 and 106). Typical IM application users have several IM applications they use and it is possible that they have different user names and passwords credentials for each. Users may also have several different IM accounts with the same IM application. By providing a central user authentication, the proposed IM content storage and retention framework 114 ensures that the rules related to storage and retention of IM content is centrally controlled and enforced. When the user tries to log on to any of the IM applications, preferably they are directed to an IM master log screen to gain access the IM framework first. The user logs into the IM framework through an IM master log on manager 116. In this manner, user access to IM applications is provided through the IM content storage and retention framework 114 and according to the safeguards that it assures. The IM master log on credentials are preferably entered via the IM content storage and retention framework user interface 128 for IM content storage and retention framework 114.

The IM master log on credentials uniquely identifies the user so that the retention rules for storage and retention of IM content can be unambiguously assigned to the user. The IM master log on credentials are retrieved from a master database 130. On receiving the IM master log on credentials from the user (e.g., via the IM master log on manager 116), the IM content storage and retention framework API 126 maps the IM master log on credentials with the one or more IM application specific log on credentials associated with the user. Thus upon completion of such central user authentication, if the user makes a selection of any of the IM applications, the user is now granted access to the IM application of his or her choice but now within the context of the IM content storage and retention framework 114. Since the user has now been unambiguously identified, rules for storage and retention of IM communications content pertaining to the user are then retrieved from the retention rules database 136 in the rule repository 134 via the rule repository API 132.

In addition to the storage and retention rules, the IM application settings rules for a particular IM session can also be customized to control, define and limit the communication to be in compliance with organizational preferences. The IM application settings are retrieved from an IM application settings rules database 138 in the rule repository 134 via the rule repository API 132. In an embodiment, the instant message application settings rules associated with the instant message master log on of the user includes rules for customizing the instantiation of the instant message application.

In another embodiment, customizing the instantiation of the instant message application comprises enabling or disabling one or more features of the instant message application. For example, if the IM master log on is that of a common user the IM features are enabled may be limited to changing font size, color of text in the IM application, starting a voice conversation option and changing status option. In another embodiment, customizing the IM application settings rules may involve disabling IM application settings according to the master log on. For example, if the IM master log on is that of a common user the instant IM message features disabled may include starting a video conversation, altering default settings of the IM application, preventing IM conversations with selected users or organizations and so on. The IM application settings are preferably defined based on factors such as an organizational policy for legal hold guidelines during litigation and the identity of the user, the identity of the other party the user is in communication with, and so on. The rules preferably are defined by an administrator via rule user interface 120, for instance.

Based on the retention rules within the rule repository 134, the retention rule API 132 enables the user to trigger a function to record IM content associated with the IM master log on. The retention rules in the rule retention repository 134 may include, but are not limited to, rule to record all IM communication by default, record IM communication with a particular communication partner, record IM communication with selected customers, store all log files, store log file with communication partners external to the organization and store log files with selected customers. Preferably, the rule user interface 120 is used to enter the rules to be stored in the rule repository 134 including the retention rules and the IM application settings rules.

Based on the retention rules stored in the retention rule database 136, the repository manager 118 transfers the recorded IM content to a central repository 142 using an IM repository API 140. The recorded IM content is stored in the recorded IM content database 144 within the central repository 142. Preferably, the IM content transferred to the central repository 142 is in a computer readable format supporting the e-discovery process. The repository manager 118 also contains information regarding relevant document repositories and the corresponding connectors to these repositories that are utilized by the IM content storage and retention framework 114.

An example of a retention rule for IM correspondence in a organization may be rule to analyses send and receive dates of the IM content, rule to specify keywords wherein instant message content containing the specified keywords will be scanned.

In an embodiment IM content storage and retention framework builds search indexes for the keywords.

The system 124 of FIG. 1B and many of the functions described with reference to the system components are merely exemplary in nature. It will be understood that many of components can be combined or further divided, which usually are implementation choices. For instance, the IM content storage and retention framework user interface 128 for general access to the IM content storage and retention framework 114 and the rule user interface 120 for entering rules can be implemented as separate components as depicted or combined as one main user interface that can show different windows based on user choices, for instance.

Figure 1C:
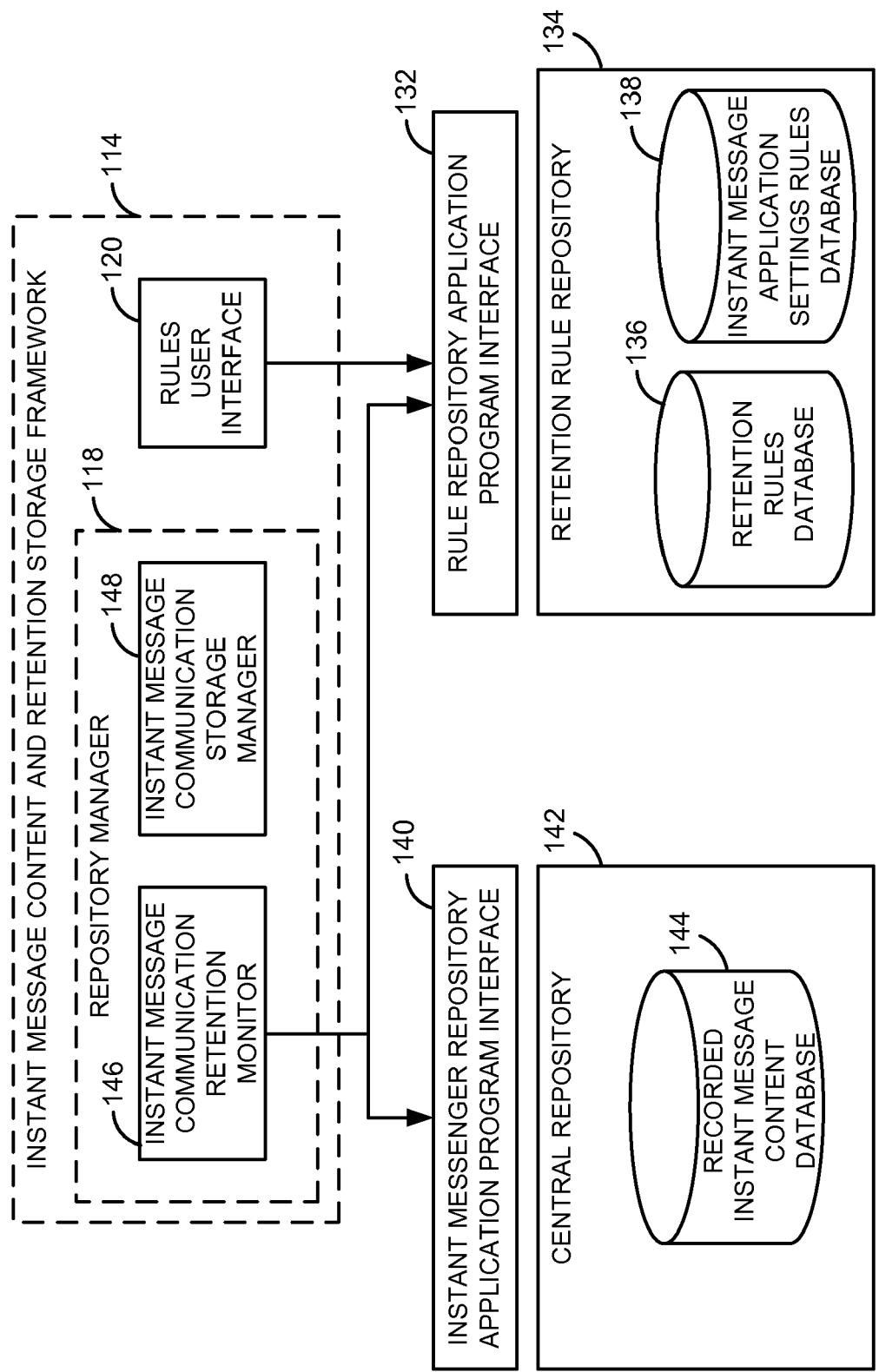
FIG. 1C is a block diagram illustrating an exemplary repository manager according to an embodiment of the invention.

FIG. 1C is a block diagram illustrating a repository manager 118 according to an embodiment of the invention. The repository manager 118 includes an IM communication monitor 146 and IM communication storage manager 148. The repository manager 118 is within the IM content storage and retention framework 114. A rule user interface 120 of the IM content storage and retention framework 114 allows an authorized user of the organization (e.g. in an administrative capacity) to define retention rules for recorded IM content. Retention rules specify retention time for recorded or stored IM content. The retention rules further include details of the recorded IM content to be archived and the date on which the recorded IM content should be deleted. The details of the recorded IM content may include the date of its creation (e.g., time stamp), its name and identity of the parts involved in the conversation and even a subject of the conversation. In one embodiment, a user subject to obligations for retaining IM communications may be requested to enter a main subject or topic of the IM conversation they are about to have and the identity of the other parties involved. The IM conversation can then be stored and indexed with this information which can later be used for applying the retention rules.

The retention rules maybe stored in a repository such as the rule repository at 134. Exemplary rules may include rules for recording all IM contents for selected users by default, recording all message contents of IM sessions with all partners outside a company, recording contents of IM sessions with specified partners, recording contents of IM sessions related to selected subjects and the like. The rule repository 134 preferably comprises a retention rules database 136 for storing the rules which can be accessed by rule repository API 132.

The IM retention rules are applied to the recorded IM content stored in the recorded IM content database 144 of the central repository 142 to manage the retention of IM content according to the policy chosen by the users. The IM communication retention monitor 146 monitors the recorded IM content stored within the recorded IM content database 144 of the central repository 142. Once the IM content being monitored meets the retention time criteria then the IM communication retention monitor 146 deletes the recorded IM content through the IM repository API 140. Deleting the recorded IM content that meets the criteria need not be the only way to process such content. Such content could also be data compressed and archived for later retrieval. Moreover, retention time need not be the only criteria. For instance, if when the obligation to retain IM communication content related to specific subject or specific users or specific partners or some combination thereof no longer exists then preferably the IM content will be deleted.

Figure 2:
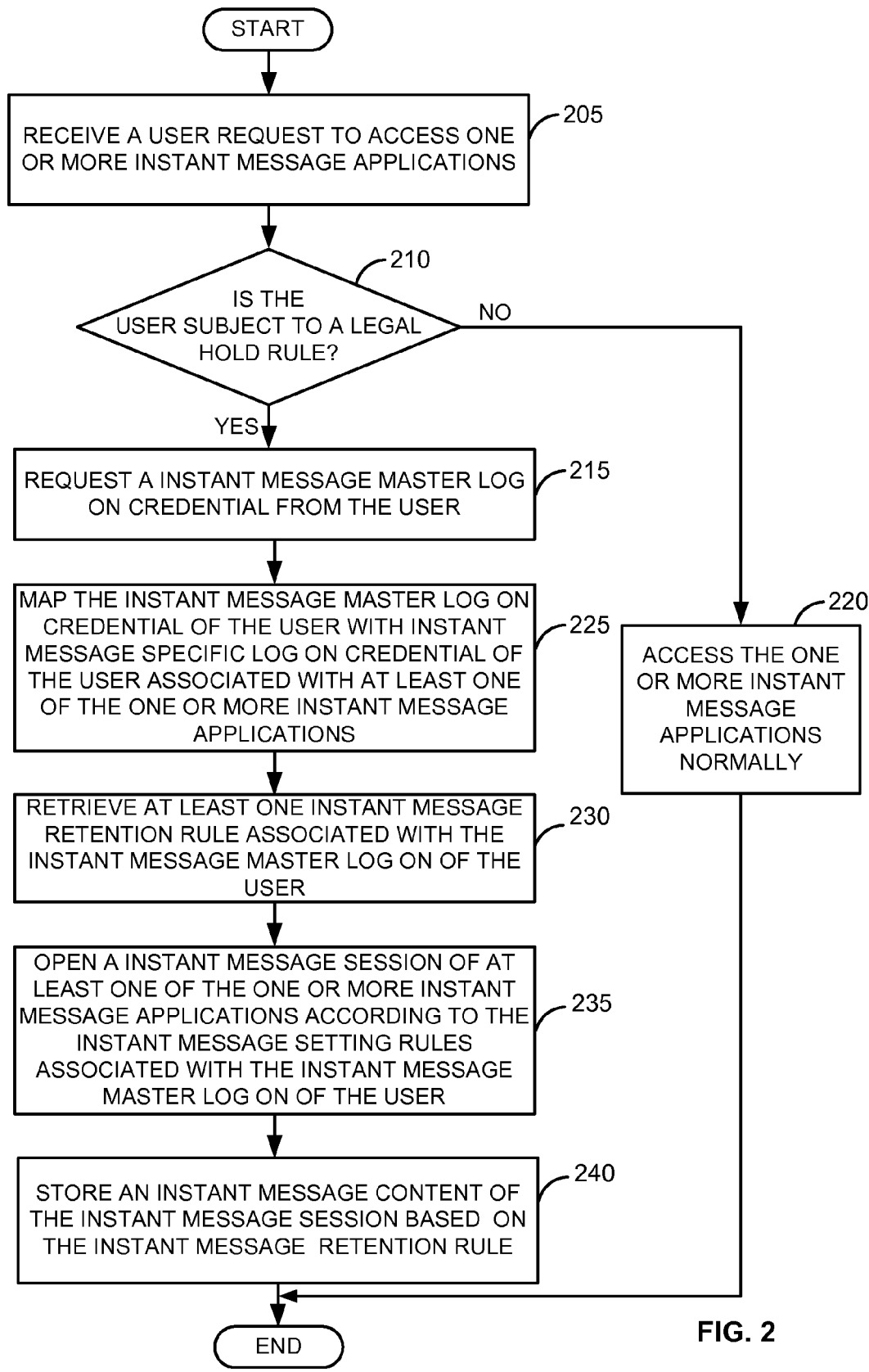
FIG. 2 is a flow diagram illustrating an exemplary process for retaining IM content subject to retention obligations such as legal hold guidelines, according to an embodiment of the invention.

FIG. 2 is a flow diagram for retaining IM content subject to retention obligations such as legal hold guidelines, according to an embodiment of the invention. The method comprises receiving a user request to access the one or more IM applications at process block 205. At decision box 210, if, for instance, the user is subject to a legal hold rule the process proceeds to process block 215. At decision box 210, if the user is not subject to a legal hold rule the process proceeds to process block 220 where the user receives access to the IM applications normally.

At 215, in response to user request 205, the IM master log on credential is requested from the user. Whether the user is directed to the IM master log on can be dependent on the user's identity. For instance, only the users identified as being subject to legal hold rules could be directed in this manner. Once the IM master log on is accepted then the user is unambiguously identified, and as a result, IM application settings rules and IM retention rules that apply to the user are also unambiguously identified. At process block 225, the IM master log on credential of the user is mapped with the IM application specific log on credentials associated with the user. At process block 230, at least one IM retention rule associated with the IM master log on of the user is retrieved. At process block 235, an IM session of at least one of the one or more IM applications is opened to begin an IM session according to the IM application setting rules associated with the IM master log on of the user. The IM content created during the session is then stored based on the IM retention rule associated with the IM master log on of the user at process block 240. In an embodiment, the IM content is preferably stored in a computer readable format for example XML format. In an embodiment the stored IM content is retained based on the IM retention rule.

In another embodiment opening the IM session of at least one of the one or more IM application includes recording the IM content associated with the IM session. In yet another embodiment recording the IM content includes recording a log file associated to the IM content.

Figure 3:
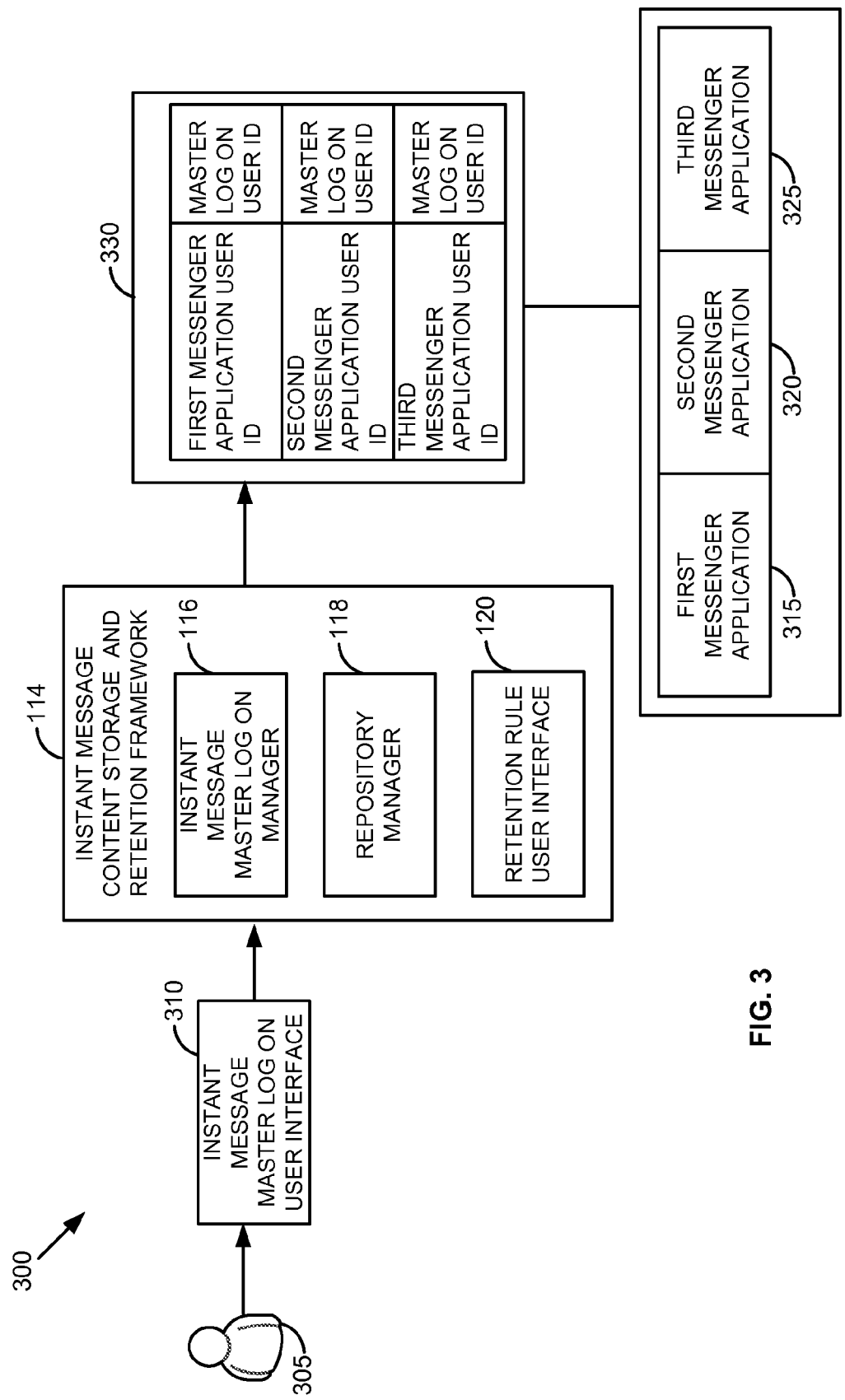
FIG. 3 is a block diagram illustrating an exemplary system of mapping one or more IM applications using the IM content storage and retention framework according to an embodiment of the invention.

FIG. 3 is an exemplary system of mapping one or more IM applications using the IM content storage and retention framework according to an embodiment of the invention. In business scenario 300, a user 305 has user accounts in first messenger application 315, second messenger application 320 and third messenger application 325. The IM master log on manager 116 within the IM content storage and retention framework 114 provides a central user authentication to all the three IM applications. The IM master log on user interface requests a master log on credentials from the user. On receiving the IM master log on credentials from the user 305 (e.g., via the IM master log on manager 116), the IM content storage and retention framework 114 maps the IM master log on credentials with the specific log on credentials of the first messenger application 315, second messenger application 320 and third messenger application 325 associated with the user as shown in 330. Thus upon completion of central user authentication, if the user makes a selection of any of the IM applications, the user is now granted access to the IM application of his or her choice but now within the context of the IM content storage and retention framework 114.

Periodically, the IM content stored according to the applicable retention rules will be deleted all together from memory or otherwise removed from the central repository 142 of FIG. 1B.

Figure 4:
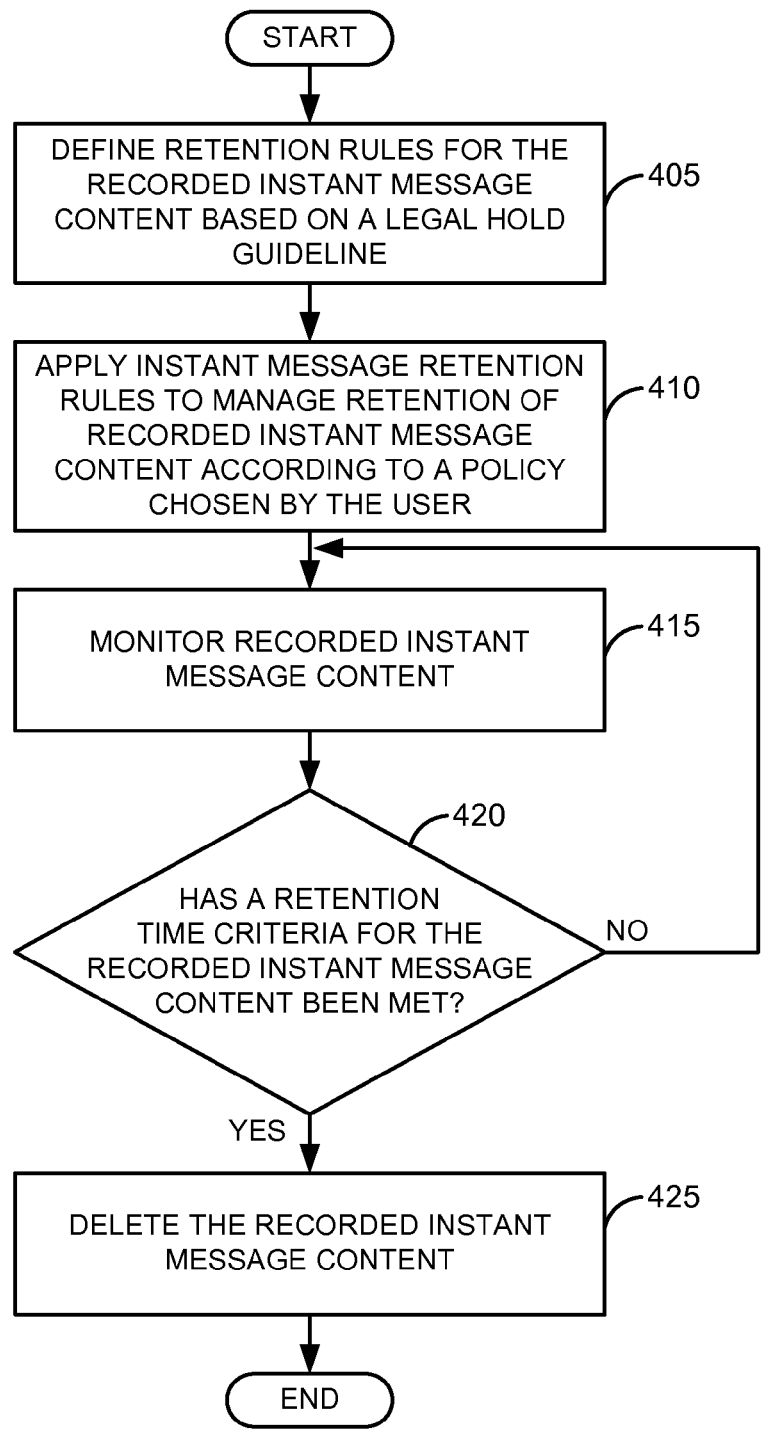
FIG. 4 is a flow diagram describing one exemplary process for deleting recorded IM content according to an embodiment of the invention.

FIG. 4 is a flow diagram describing one exemplary process for deleting the recorded IM content according to an embodiment of the invention. At process block 405, retention rules are defined for the IM content based on IM content retention obligations such as the legal hold guidelines. At process block 410, IM retention rules are applied to the recorded IM content according to a policy chosen by the user. The recorded IM content is monitored at process block 415. At decision box 420, if a retention time criteria for the recorded IM content is met, the process proceeds to process block 425. At process block 425, the recorded IM content is deleted. At decision box 420, if a retention time criteria for the recorded IM content is not met the process proceeds to process block 415.

Figure 5:
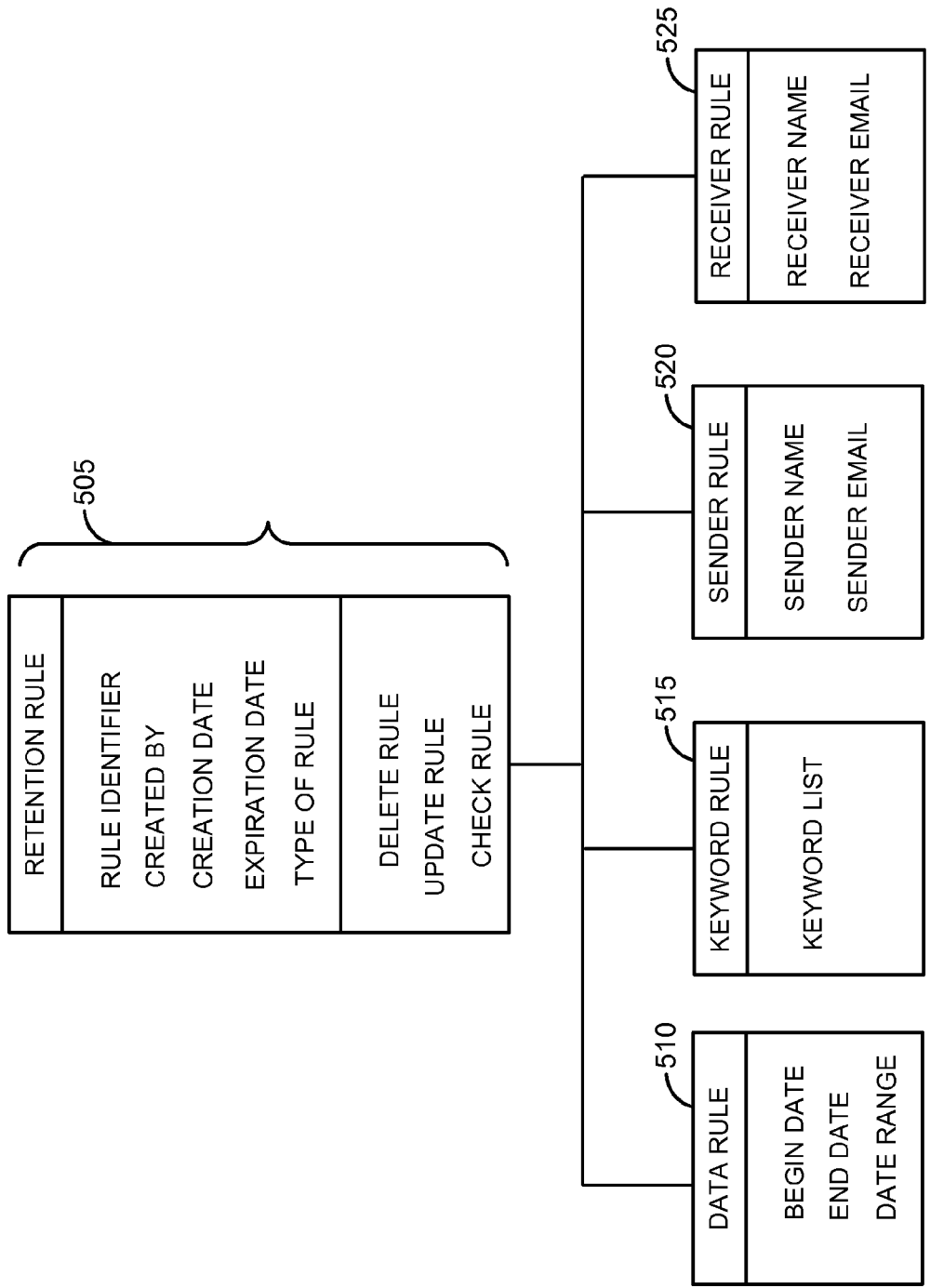
FIG. 5 is a block diagram describing an exemplary data structure of a retention rule according to an embodiment of the invention.

FIG. 5 is a block diagram describing an exemplary data structure of a retention rule according to an embodiment of the invention. The exemplary data structure of retention rule 505 for storing the IM content includes a rule identifier, details of rule created, date of the rule creation, expiration date of the rule and type of rule. The retention rules may be deleted, updated or checked by an authorized user of the organization (e.g. in an administrative capacity).

The retention rule types may be data rule 510, keyword rule 515, sender rule 520 and receiver rule 525. The data rule 510 includes details relating to a date such as begin date, end date and specified date range. The key word rule 515 includes a keyword list. The sender rule 520 includes sender name and sender email details. The receive rule 525 includes receiver name and receiver email details.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a way of saying that execution of the software by a computing device causes the device to perform an action or produce a result. The invention may be implemented as a method performed in a client-server network with the execution of the methods steps distributed across the network. Hence, the method claims are not restricted to any particular architecture within which they may be executed.

Elements of the invention may also be provided as a tangible machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of tangible machine-readable media suitable for storing electronic instructions.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A method of storing and retaining instant message content related to usage of a plurality of instant message applications subject to retention obligations, the method comprising:
    receiving a user request to access the plurality of instant message applications;
    accessing the plurality of instant message applications by requesting an instant message master log on credential from the user;
    mapping the instant message master log on credential of the user with instant message application specific log on credentials of the user associated with the plurality of instant message applications;
    based on the instant message master log on, opening instant message sessions of the plurality of instant message applications according to instant message application setting rules;
    based on the instant message master log on, retrieving at least one instant message retention rule associated with the user;
    based on the retrieved retention rule, trigger a function to record an instant message content associated with the instant message master logon; and
    storing the recorded instant message content of the instant message session based on the instant message retention rules associated with the instant message master log on of the user.

2. The method of claim 1, further comprising retaining the instant message content based on at least one instant message retention rule associated with the instant message master log on of the user.

3. The method of claim 1, wherein storing the recorded instant message content comprises storing the instant message content in a computer readable format.

4. The method of claim 1, wherein triggering the function to record the instant message content associated with the instant message master logon comprises recording a log file associated with the instant message content.

5. The method of claim 1, wherein retrieving at least one instant message retention rule associated with the user comprises retrieving the retention rule from a retention rule database.

6. The method of claim 5, wherein retrieving the retention rule from the retention rule database comprises accessing the retention rule database through a rule repository application programming interface.

7. The method of claim 1, wherein the instant message application settings rules comprises rules for customizing the instantiation of the instant message application.

8. The method of claim 7, wherein customizing the instantiation of the instant message application comprises enabling one or more features of the instant message application.

9. The method of claim 7, wherein customizing the instantiation of the instant message application comprises disabling one or more features of the instant message application.

10. A computer system for storage and retention of instant message content subject to storage and retention obligations, the system comprising:
    an instant message content storage and retention framework operable for providing centralized management of usage of instant message applications by users subject to the storage and retention obligations;
    an instant message content storage and retention framework application programming interface for connecting a plurality of instant message applications to the instant message content storage and retention framework;
    an instant message content storage and retention framework user interface operable for receiving master log on user credentials of the user for providing centralized access to the instant message application;
    a rule user interface in communication with instant message content storage and retention framework application programming interface to maintain rules related to the storage and retention obligations; and
    a backend comprising a central repository for storing instant message content subject to the storage and retention obligations and a rule repository configured to store the rules related to the storage and retention obligations.

11. The computer system of claim 10, wherein the instant message content storage and retention framework comprises a instant message master log manager operable for mapping master log on credentials of the user associated with the plurality of instant message applications.

12. The computer system of claim 10, wherein the rule repository stores the rules related to the storage and retention obligation in a computer readable format.

13. An article of manufacture, comprising:
    a machine readable medium having instructions which when executed by a machine cause the machine to perform operations comprising:
    in response to a user request to access a plurality of instant message applications, requesting a instant message master log on credential from the user;
    mapping the instant message master log on credential of the user with instant message application specific log on credentials of the user associated with the plurality of instant message applications;
    based on the instant message master log on, opening instant message sessions of the plurality of instant message applications according to the instant message application settings rules;
    based on the instant message master log on, retrieving at least one instant message retention rule associated with the user;
    based on the retrieved retention rule, trigger a function to record an instant message content associated with the instant message master log on; and
    storing the recorded instant message content of the instant message session based on the instant message retention rules associated with the instant message master log on of the user.

14. The article of manufacture in claim 13, further comprising instructions for retaining the instant message content based on the instant message retention rule associated with the instant message master log on of the user.

15. The article of manufacture in claim 13, wherein the instant message application settings comprises rules for customizing the instantiation of the instant message application.

16. The article of manufacture in claim 15, wherein customizing the instantiation of the instant message application comprises enabling one or more features of the instant message application.

17. The article of manufacture in claim 15, wherein customizing the instantiation of the instant message application comprises disabling one or more features of the instant message application.

* * * * *